Sept. 6, 1960  T. L. ETHERINGTON  2,951,349
VARIABLE CAPACITY REFRIGERATION SYSTEM
Filed June 23, 1958
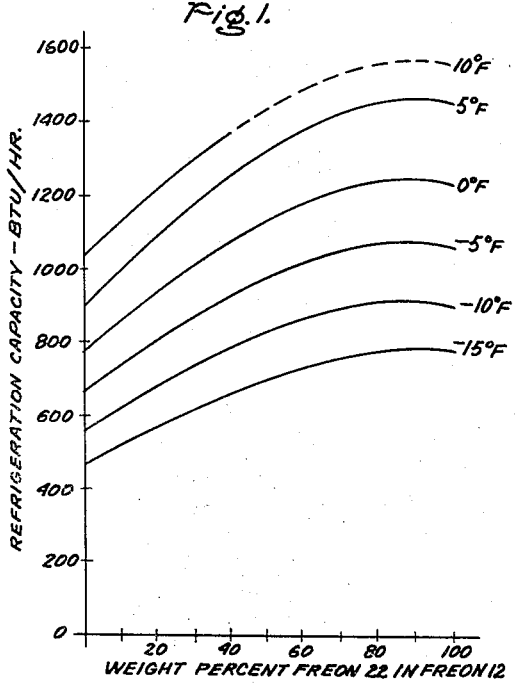
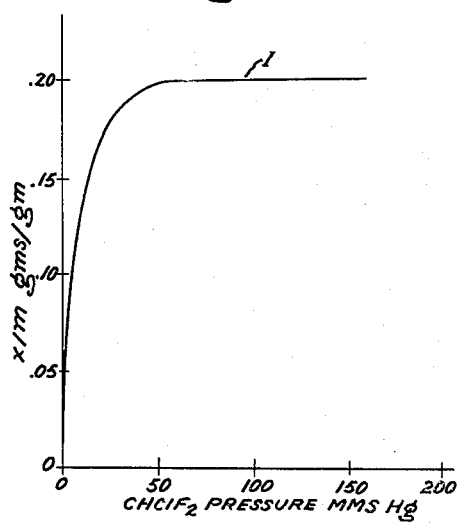
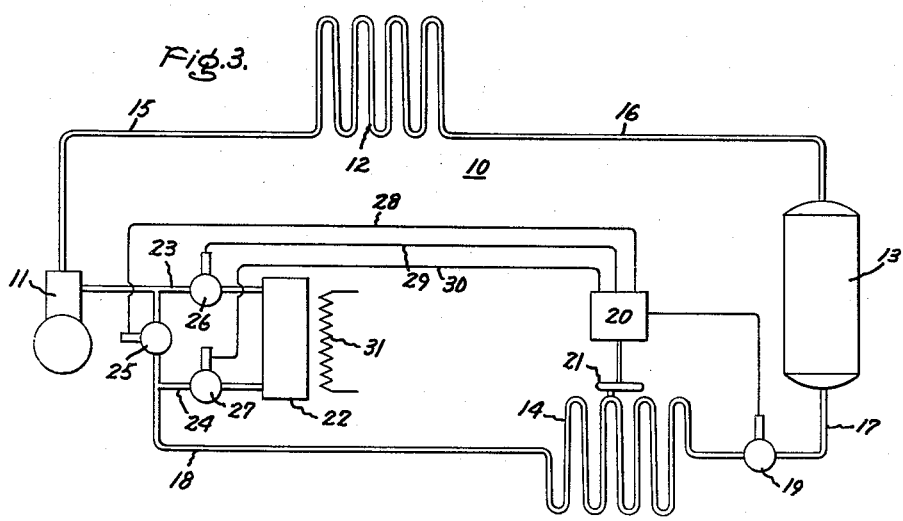
Inventor:
Theodore L. Etherington,
by Joseph T Cohen
His Attorney.

United States Patent Office 2,951,349
Patented Sept. 6, 1960

2,951,349
VARIABLE CAPACITY REFRIGERATION SYSTEM

Theodore L. Etherington, Burnt Hills, N.Y., assignor to General Electric Company, a corporation of New York Filed June 23, 1958, Ser. No. 743,532

9 Claims. (Cl. 62—149)

This invention relates to a variable capacity refrigeration system, and, more particularly, to a variable capacity refrigeration system employing a plurality of refrigerants with means to selectively adsorb one refrigerant from a mixture thereof to the exclusion of the other or others.

Variable capacity refrigeration or dual temperature refrigeration systems are becoming important for application in both commercial and domestic type refrigeration systems, air conditioning systems, heat pumps and the like heat exchange apparatus. The variable capacity refrigeration systems proposed generally employ a pair of refrigerants in mixture form with suitable separation means to attain the variable capacity aspect. Previously, separation means included many well known devices such as purging means, distilling apparatus, or the use of mutually insoluble refrigerants of different liquid density with related mechanical equipment to carry out the separation. Depending on the refrigerant being employed, a material separator may also be utilized as the separating means. Material separators have been previously employd for the general separation of various gases, liquids, and vapors, and examples of these materials would include highly porous silica gel, activated carbon, salt water solutions, etc. Such a material separator if applicable to refrigeration systems, could eliminate much of the bulky and uneconomical mechanical apparatus previously necessary for separation. Also, if the material is capable of adsorption and desorption of a refrigerant within a given time limit, an economical and efficient system would be provided. Most modern refrigeration systems employ the Freon gases as refrigerants, the term "Freon" being attributed to the E. I. du Pont de Nemours Company as describing that group of halogenated hydrocarbons containing one or more fluorine and/or chlorine atoms. Of the Freons, dichlorodifluoromethane and monochlorodifluoromethane, Freon-12 and Freon-22, or $CCl_2F_2$, and $CHClF_2$, respectively, are quite desirable for refrigeration systems, since mixtures thereof show excellent refrigerating capacities, and variations in the mixtures of these Freons, in turn, provide definite capacity variations. However, mixtures of Freon-12 and Freon-22 have proved to be quite difficult to vary by adsorption of one of the gases from the other, and their particular characteristics are close enough in some respects so that one is often found as an impurity in the other.

It is an object of this invention to provide a variable capacity refrigeration system utilizing Freon-12 and Freon-22.

It is another object of this invention to provide an adsorption-desorption material to vary the ratio or composition of a Freon-12, Freon-22 mixture.

It is another object of this invention to provide variable capacity refrigeration utilizing a Freon-12, Freon-22 refrigerant mixture with a material separator.

Briefly described, this invention includes a variable capacity refrigeration system which employs a mixture of Freon-12 and Freon-22 as the refrigerants therein, and the selective separation or varying of the weight mixture of the Freon-12 and Freon-22 by the use of a synthetic zeolite or molecular sieve as the varying material separator.

This invention will be better understood when taken in connection with the following description and the drawings, in which:

Fig. 1 is a series of curves depicting the refrigerating capacity of various mixtures of Freon-12 and Freon-22;

Fig. 2 illustrates a curve of the adsorption characteristics of the molecular sieve of this invention on Freon-22; and Fig. 3 is a schematic representation of a refrigeration system in accordance with this invention.

The material utilized as a separating agent or adsorber in this invention is a form of a synthetic crystalline zeolite, a more complete description of which may be found in the Journal of the American Chemical Society, vol. 78, No. 23, December 8, 1956, pages 5963–5977. The basic synthetic zeolite which is designated by type A is represented by the formula $Na_{12}[(AlO_2)_{12}(SiO_2)_{12}]$ 0.27 $H_2O$, from which the water may be removed. Replacement of the sodium ions by calcium ions effectively enlarges the pore openings such that straight chain hydrocarbons are readily adsorbed but branch chain hydrocarbons are excluded. The formula becomes $$Ca_6[(AlO_2)_{12}(SiO_2)_{12}] \ 0.27 \ H_2O$$

which is the type of zeolite or molecular sieve employed in this invention.

In Fig. 1, an examination of the group of curves, taken from experimental apparatus, illustrates the particular desirable capacities of mixtures of Freon-12 and Freon-22. For example, it may be seen that a 100 percent Freon-12 refrigerant at 5° F. represents slightly more than 900 B.t.u. per hour capacity, while if the mixture were changed to a 50 percent Freon-12 and a 50 percent Freon-22, by weight, mixture, the capacity of the same apparatus would be approximately 1300 B.t.u. per hour at 5° F. In a refrigeration system, assuming for example, a 10 percent Freon-22, 90 percent Freon-12, by weight, mixture is employed to maintain a temperature of 5° F., the mixture represents a capacity of 1000 B.t.u. per hour, but in order to maintain the 5° F. when the capacity requirement rises, for example, to 1200 B.t.u. per hour, Freon-22 is removed until the composition of circulating refrigerant becomes 35 percent Freon-22 and the capacity at 5° F. is 1200 B.t.u. per hour.

It has been discovered that the synthetic zeolite $$Ca_6[(AlO_2)_{12}(SiO_2)_{12}]$$

otherwise known as a molecular sieve, is a selective separator for Freon-12 and Freon-22 mixtures. The molecular sieve adsorbs Freon-22 from the Freon-12–Freon-22 mixture with little adverse effect, and will give up Freon-22 without difficulty under normal operating requirements of refrigerant systems with respect to suction pressures and temperatures.

The curve of Fig. 2 illustrates the adsorbtion characteristics of the molecular sieve upon Freon-22, the X/M value being grams of Freon-22 adsorbed per gram of molecular sieve. The process is reversible and the sieve readily gives up the adsorbed Freon-22.

The information represented by the curves of Figs. 1 and 2 is integrated in an exemplary working refrigeration system as illustrated schematically in Fig. 3. In Fig. 3, the exemplary refrigeration system 10 includes the well known components of a compressor 11, condenser 12, receiver 13, and evaporator 14, all connected in circuitous fluid flow relationship by means of conduits 15, 16, 17 and 18. A Freon mixture, for example Freon-12 and Freon-22, is compressed by the compressor 11 to flow into the condenser 12 where it is condensed to liquid form and then stored in receiver 13. Thereafter, the refrigerant is permitted to expand in the evaporator 14 for cooling purposes, and the rate or amount of refrigerant flowing into the evaporator 14 is controlled by any well known type of metering or control device, such as valve 19 positioned in the conduit 17 between the receiver 13 and the evaporator 14. The external control of valve 19 is generally accomplished by a combined control mechanism which incorporates complete control over the entire system. Generally speaking, the control mechanism as indicated by the numeral 20 is to be adjusted by the user of the system. Control 20 includes a suitable temperature and/or pressure sensitive device 21 adjacent the evaporator. The temperature is a function of the pressure in the evaporator such that the system operates at a constant pressure to maintain a given temperature or a change in temperature. In the preferred form of this invention, the device 21 is any well known pressure sensitive device, such as a bellows, diaphragms, expansible chambers, and the like, the action of which may be changed at the control 20 to regulate the pressure at which valve 19 is operated, to thus maintain constant pressure but varying temperature for the case when refrigerant composition varies in the system.

The adsorbent molecular sieve separator of this invention is contained within a sorption vessel 22 which may be exposed to the flow of refrigerant mixture for adsorption purposes. As indicated by the curves of Figs. 1 and 2, a suitable reduction of pressure provides a release of adsorbed Freon-22 from the molecular sieve. Accordingly, when the capacity of the refrigerant mixture or Freon-12 alone that is flowing in the system is below that necessary to meet the capacity requirements to maintain a desired temperature, the pressure in the evaporator is considerably reduced. The pressure in the evaporator is controlled by the pressure sensing device 21 controlling the output of the valve 19. Under these conditions, the weight mixture of refrigerant flowing in the system is changed for an increase in capacity while still maintaining evaporator temperature. Vessel 22 is connected in fluid flow relationship between the compressor 11 and evaporator 14 by means of conduits 23 and 24. It may be seen from Fig. 3 that a series of valves 25, 26 and 27 are employed to regulate or obtain the desired refrigerant flow to the proper component. For example, when valves 26 and 27 are closed and valve 25 is open, the refrigerant flows through the system from compressor 11, condenser 12, receiver 13, evaporator 14, and returns to the compressor 11. The sorption vessel is thus out of the flow system. Valves 25, 26 and 27 are actuated to change the composition and therefore the capacity of the refrigerants in the system, and are suitably connected to the control 20 by actuating lines 28, 29 and 30. It is to be understood that these lines may represent pressure lines or mechanical or electrical leads for operating suitable related valves or other metering devices. A reduction in pressure in the evaporator for a desired pressure control indicates a falling capacity of the system and accordingly by the integrated control means 20, valve 27 remains closed, and valve 26 is opened and valve 25 closed. Therefore, the pressure in the vessel 22 is reduced and the molecular adsorbent sieve undergoes desorption by the action of reduced pressure. Where additional heat is desired for the desorption process, the vessel 22, when utilized in a heat pump or air conditioning application, may be alternately exposed to internal or external temperatures. On the other hand, a small resistance heater 31 may be employed where necessary and may be adapted for connection into the integrated control 20. The heater 31 is then actuated by control device 20 to aid in the removal of adsorbed Freon-22 from the molecular sieve material in vessel 22, the removed Freon-22 flowing through conduit 23 to compressor 11. The temperature of the vessel 22 should be limited to below 150° C. in order to minimize any decomposition effects of the sieve material. The combination of raising the temperature of vessel 22 and the evacuating action of the compressor results in a quick and effective means to provide desorption of Freon-22. When the desorbed Freon-22 is taken up by the compressor, valve 26 and valve 27 are closed, and valve 25 is opened. To change the capacity of the system valve 25 is then closed and valves 26 and 27 opened to admit the Freon-12 and Freon-22 mixture to the vessel 22. After a sufficient quantity is admitted together with a predetermined pressure, valves 26 and 27 are closed and valve 25 is opened. The system then operates upon a different refrigerant mixture and accordingly a changed capacity.

It is easily seen that by this invention there is provided a novel form of variable capacity refrigeration system and one that utilizes the desirable refrigerants, Freon-12 and Freon-22, in mixture form. Such a system is attained through the employment of the adsorption-desorption method in conjunction with a molecular sieve separator.

The invention is not limited to a particular heat exchange system nor to a system employing only a pair of refrigerants since more than two refrigerants may be employed in a given system and adsorption of one or more will vary the capacity.

It is also contemplated that the use of the molecular sieve may be applied to various other systems and arrangements, such as, for example, the system disclosed in my copending application Serial No. 743,602, Etherington and Cannon, and assigned to the same assignee as the present invention.

While other modifications and variations of this invention within the scope thereof have not been described, the invention is intended to include all such as may be embraced by the following claims.

What I claim as new and desire to secure by Letters Patent of the United States is:

1. A variable capacity refrigeration system, a plurality of refrigerants flowing through said system, a sorption vessel in said system, said sorption vessel containing a molecular sieve adsorber, and means to admit the flow of refrigerant mixture into said vessel for said adsorber to selectively adsorb and desorb one of said refrigerants from and into the system.

2. The invention as claimed in claim 1 wherein said refrigerants include a pair of Freons.

3. The invention as claimed in claim 2 wherein said pair of Freons are $CCl_2F_2$ and $CHClF_2$.

4. A variable capacity refrigeration system, a pair of refrigerants, one of which is a Freon, circulating in said system, a sorption vessel in said system, said sorption vessel containing a synthetic crystalline zeolite molecular sieve for the adsorption and desorption of one of said refrigerants, and means to admit the flow of refrigerant mixture in said system into said vessel for said molecular sieve to selectively adsorb and desorb one of said refrigerants from and into the system.

5. The invention as claimed in claim 4 wherein the said zeolite is represented by the formula

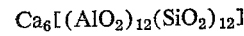

$$Ca_6[(AlO_2)_{12}(SiO_2)_{12}]$$

6. The invention as claimed in claim 4 wherein said sorption vessel is connected into the system between the evaporator and the low pressure side of the compressor.

7. In a variable capacity refrigeration system including a compressor, a condenser and evaporator connected in circuitous fluid flow relationship, the combination comprising, a pair of refrigerants circulating in said system, said refrigerants being $CCl_2F_2$ and $CHClF_2$, a sorption vessel in said system, said sorption vessel containing a molecular sieve represented by the formula

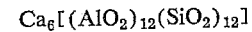

$$Ca_6[(AlO_2)_{12}(SiO_2)_{12}]$$

and temperature sensitive means responsive to temperature in said system to admit the flow of refrigerant mixture into the said vessel for the molecular sieve therein to selectively adsorb one of said refrigerants to the exclusion of the other.

8. A variable capacity refrigeration system, a plurality of refrigerants flowing through said system one of which is a Freon, a sorption vessel in said system, said sorption vessel containing a molecular sieve adsorber, and means to admit the flow of refrigerant mixture into said vessel for said adsorber to selectively adsorb and desorb said Freon from and into the system.

9. The invention as recited in claim 8 wherein said Freon is $CHClF_2$.

References Cited in the file of this patent

UNITED STATES PATENTS

| | | |
|---|---|---|
| 2,359,595 | Urban | Oct. 3, 1944 |
| 2,430,692 | Touborg | Nov. 11, 1947 |

OTHER REFERENCES

Breck et al., Journal of American Chemical Society, December 8, 1956, volume 28, Number 23.

Barrer, Journal of the Society of Chemical Industry, May 1945, volume 64, pages 130–135.